Nov. 4, 1969     J. PURRER ET AL     3,475,890
PLURAL RAKE HAYING MACHINE WITH MEANS
FOR ADJUSTING WIDTH OF SWATH
Filed June 19, 1967     2 Sheets-Sheet 1
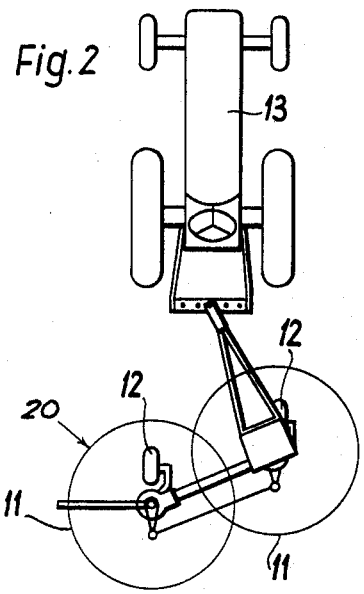
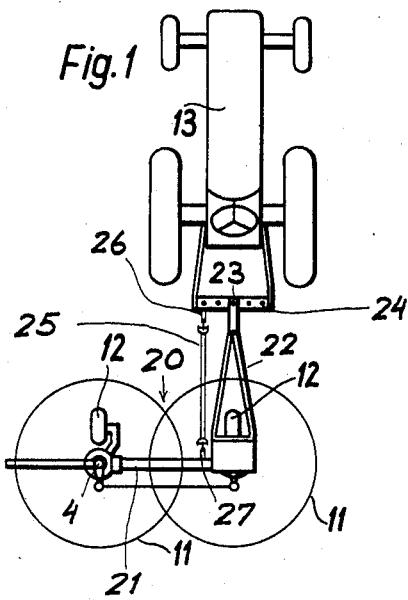
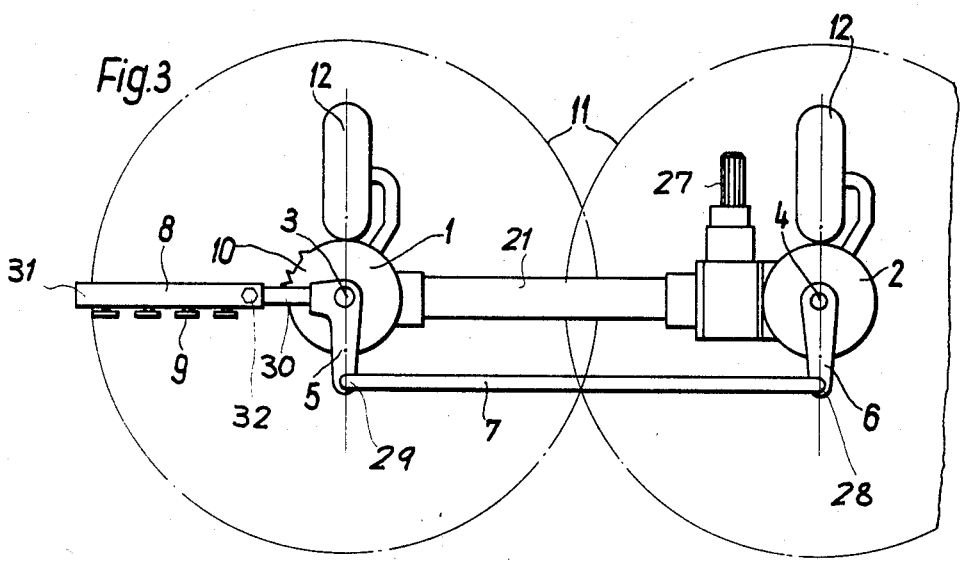
Josef Pürrer
Martin Maier
Inventors.
By Karl F. Ross
Attorney United States Patent Office 3,475,890
Patented Nov. 4, 1969

3,475,890
PLURAL RAKE HAYING MACHINE WITH MEANS
FOR ADJUSTING WIDTH OF SWATH
Josef Purrer and Martin Maier, Gottmadingen, Germany, assignors to Maschinenfabrik Fahr Aktiengesellschaft, Kreis Constance, Germany, a corporation of Germany
Filed June 19, 1967, Ser. No. 647,069
Claims priority, application Germany, June 24, 1966,
M 69,952
Int. Cl. A01d 57/12, 79/02
U.S. Cl. 56—370                                    10 Claims

ABSTRACT OF THE DISCLOSURE

A haying machine having a pair of rotary rakes horizontally spaced upon a support beam and driven by respective bevel-gear assemblies in the rake heads on the beam and a pair of support wheels whose shafts extend through each of the rake heads and thereabove are provided with levers connected by a pivotal link rod which forms a parallelogrammatic linkage with the levers and the support beam. One of the levers is a bellcrank lever whose arm forms a handle for swinging the beam into a position oblique to the direction of advance of the machine from a position perpendicular to this direction and has a locking pawl for setting the positions of the beam with respect to the wheels. The handle may carry rearwardly facing reflectors for visibility on a highway.

---

Our present invention relates to hay-making machines and similar apparatus for the raking, turning and tedding of ground crops such as cut grass, straw, stalks and the like and, more particularly, to a rotary-rake system of this character wherein the rakes are formed by angularly spaced arms reaching outwardly from a hub and carrying rake fingers which sweep in circular paths in substantially horizontal planes while the rakes are rotatable about generally upright axes. A rake system of this type is described and claimed in the commonly assigned copending application Ser. No. 577,335 of Sept. 6, 1966.

In general, a hay-making machine of this type comprises a support consisting of at least one hollow horizontal beam through which extends the drive shaft for a plurality of rakes, at least two being required for the purposes of the present invention, each of which has a hub journaled on the support beam at a so-called rake head which contains a gear arrangement for transforming rotation of the shaft in the beam into rotary rake movement. More specifically, the support beam may be provided at its extremities with rake heads which constitute housings for respective bevel-gear assemblies for motion transfer to upright shafts affixed to the hub of the respective rakes. Each rake is provided with an annular array of depending rake fingers and may be constituted of angularly equispaced arms which extend radially from the hub and are provided at their free extremities with spring fingers for engagement with the ground crop. The support is, in turn, carried by wheels which may be located generally at the rake heads thereof, while the entire assembly is towed by a prime mover such as an agricultural tractor to which the support is linked at the drawbar. A power-transmission shaft may be provided between the power-take-off shaft of the tractor and an input shaft carried by the support which, in turn, drives the shaft extending through the beam.

In rotary-rake assemblies of this type, wherein the rake axis is generally upright, the rakes are horizontally spaced along the beam and the support beam is generally horizontal, it is advantageous to provide means for reorienting the support frame and the rakes with respect to the direction of advance of the machine for transportation thereof and for use. For example, it is possible to have the swath spanned by the rake halves as wide as possible during hay-making operations and even wider than the tractor. On the other hand, when transporting the machine to and from the field, it may be necessary to pass over roads, highways and the like in which the operating width of the system is excessive. It has been proposed heretofore to overcome this disadvantage by providing complex mechanisms for adjusting the wheels of the machine from the towbar of the apparatus, for example, by swinging the towbar through an angle of 90° to align the rakes one behind the other, or equally problematical arrangements whereby outrigger portions of the support are swung inwardly to facilitate road transport. The pivot assemblies of these mechanisms are prone to malfunction and increase the number of parts susceptible to wear and contamination.

It is, accordingly, the principal object of the present invention to provide a rotary-rake hay-making machine wherein these disadvantages are obviated.

A more specific object of this invention is to provide a rotary-rake apparatus for the raking, turning and tedding of ground crops, which can be conveniently and simply shifted from a wide-swath operating position into a narrow-swath transport position, with mechanism of low cost and little tendency to inoperativeness.

Yet another object of this invention is to provide an apparatus of the character described which is easier to transport and provides greater safety in passing to and from the field.

We have found that these objects can be obtained in a relatively simple system for rotary-rake hay-making machines having at least two horizontally spaced rotary rakes with generally upright axes, a generally horizontal support beam interconnecting these rakes and provided at it extremity with rake heads forming housings for the rake gearing, and respective wheel members carrying the support at each of these heads, the improved system comprising respective upright wheel shafts extending along the axis of rotation of the respective rakes and thus coaxial therewith while protruding on the upper side of the machine through the respective rake heads and rotatably supporting the respective wheels for rotation about the rake axes; each of these shafts is provided with a respective lever lying above the respective rake head and interconnected by a link bar, generally parallel to the support beam and pivotally connected to the levers at respective free arms, for coupling the shafts for joint rotation in the same sense relatively to the support and to the rake heads.

According to a more specific feature of this invention, the support assembly includes a coupling means in the form of a towing linkage which extends forwardly from the support bar at one of the heads to connect this bar with the drawbar of the towing vehicle, i.e. the tractor. This towing linkage is advantageously nonrotatable with respect to the support bar about any vertical axis but is pivotally linked with the drawbar of the tractor for swinging movement about a vertical axis. In this case, joint angular movement of the wheel shafts and of the wheels to maintain them generally parallel to one another (i.e. rotatable in respective parallel vertical planes) permits the towed machine to assume a position approximately centered behind the towing vehicle with one wheel and rake set back from the other, and the support beam oblique to the direction of advance of the machine. Moreover, the distances between the axes of the shafts and the points at which the link rod is pivotally connected to each of the levers are equal as are the distances between the shafts and the pivots of the link rod. Thus the link rod forms with the levers and the portion of the support beam between the shafts a parallelogrammatic linkage whereby the wheels are always positioned in parallelity with one another.

In the offset or oblique position, the wheels and the drawbar pivot support the machine at the vertices of a static-force triangle providing considerable stability for the unit. Advantageously, one of the levers, preferably the outermost lever with respect to the longitudinal vertical median plane through the tractor and the machine towed thereby with a handle, is formed as a bellcrank lever for this purpose. The handle, which may extend outwardly from the assembly, actuates the linkage to selectively position the support beam and adjust the orientations of the wheels. Furthermore, this handle may be provided with a locking pawl releasably co-operating with detent formations in the respective rake head or housing for locking the hay-making machine in its transport and operating positions respectively.

The above and other objects, features and advantages of this invention will become more readily apparent from the following description, reference being made to the accompanying drawing in which:

FIG. 1 is a diagrammatic plan view of a hay-making machine according to the present invention with the rakes in the working position and towed by a tractor;

FIG. 2 is a view similar to FIG. 1 showing the rake in its transport position;

FIG. 3 is an enlarged plan view of the link system;

Figure 4:
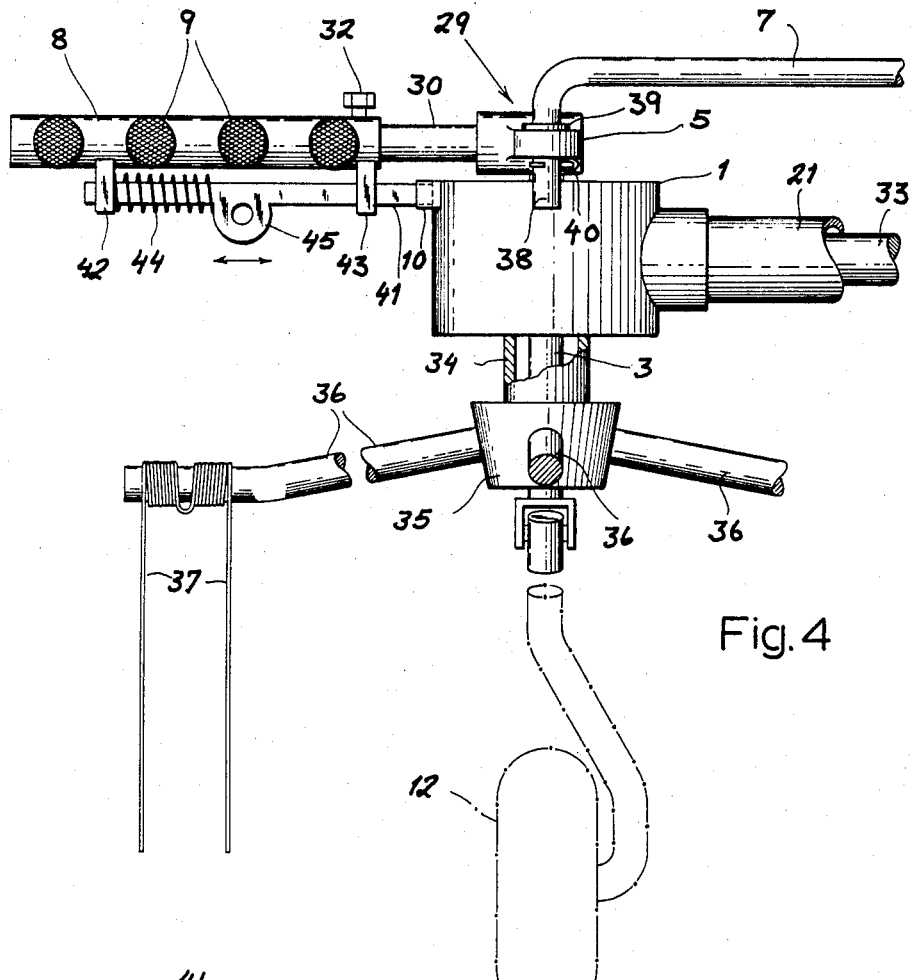
FIG. 4 is a detail view of a portion of this system drawn to an enlarged scale and partly broken away.

In FIGS. 1–3, we show a rake assembly 20 which comprises a support beam 21 interconnecting a pair of heads 1 and 2 and connected at the latter, in a fixed angular relation, to coupling means including a towing linkage 22 of conventional type. The coupling means further includes a drop pin 23 hingedly connecting the hay-making machine 20 to the drawbar 24 of an agricultural tractor 13. As is illustrated in FIG. 1, a shaft 25, provided at its extremities with universal joints, connects the power-take-off shaft 26 of the tractor with the power-input shaft 27 of the hay-making machine. The wheels 12 are here shown to be mounted upon shafts 4 which extend upwardly through the respective rake heads 1 and 2 and are provided thereabove with levers 5 and 6. Lever 6 is locked to the shaft 4 for joint rotation therewith and is pivotally connected at 28 with a link rod 7 whose other end is pivotally received at 29 in lever 5. The latter is a bellcrank lever whose free arm 30 is formed with a handle 8 whose length is several times greater than the distance between the axis of shaft 3 and the pivot 29 to gain mechanical advantage is adjusting the assembly. The handle 8 may be removable from the lever arm 30 and may remain in place only during road transport. In this case, the rear flank 31 of this handle is provided with an array of light reflectors 9 or other warning means (e.g.. lights) to signal oncoming vehicles that a relatively small moving agricultural implement is in their path. A bolt 32 may lock the sleeve 8 on the arm 30.

From FIG. 3, it can be seen that the link rod 7 has a length between the pivots 28 and 29 which is substantially equal to the distance between the shafts 3 and 4 while distances 3–29 and 4–28 are likewise equal. Consequently, a four-point parallelogrammatic linkage is formed which will rotate the wheels 12 in substantial parallelism. When the lever 5, 8, 30 is swung in the clockwise sense with shaft 3 relative to the head 1, the assembly assumes the position illustrated in FIG. 2 in which the outrigger head 1 and its wheel 12 are set back from the head 2 and the corresponding wheel. Since the wheels 12 remain parallel to one another, the machine 20 when in the position illustrated in FIG. 2 is centered behind the tractor 13 and has an effective width athwart the load line which is less than the swath during operation (FIG. 1). The head 1 is provided with indexing notches 10 cooperating with a pawl on the arm 30, 8 which indexes the system in the two positions represented in FIGS. 1 and 2.

Figure 5:
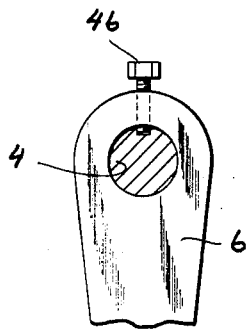
FIG. 5 represents another detail of this invention.

Referring now to FIGS. 4 and 5, it can be seen that, aside from the structure described above in connection with the wheel assemblies 3, 4, 12 and the linkage 5–10, the device can be constructed as described and illustrated in the aforementioned copending application with respect to the structure of the rakes, the drive mechanisms therefor and the adjustment means for the angles of the rake planes. In FIG. 4, moreover, we show that each head 1 or 2 can be mounted at the end of the beam 21 which is hollow and passes the drive shaft 33 from a worm or other transmission fed by input shaft 27. Within the heads 1 and 2, bevel gearing is provided as described and illustrated in the aforementioned copending application to drive a tubular shaft 34 carrying the hubs 35 of the rakes whose rotational paths are represented at 11 in FIGS. 1–3. The hubs 35 can, also in accordance with the above-mentioned application, be provided with radial arms 36 at the ends of which fingers 37 depend for engagement with the group crop. The wheel shafts 3 and 4 extend through the hollow shafts 34 and the hubs 35.

As is also evident from FIG. 4, the link rod 7 has at the pivots 28 and 29 downwardly turned shanks 38 which pass through the levers 4 and 5 and rest thereagainst with shoulders 39. Cotter pins 40 prevent the rods 7 from jumping out of these levers. As noted earlier, means are provided for locking the linkage and shafts in adjusted position. This means includes a detent means shown as a pawl arrangement which locks the linkage 5–9 in its selected positions corresponding to FIGS. 1 and 2. Here, the pawl is shown to be constituted by a slidable bolt 41 which is guided in a pair of brackets 42 and 43 and is biased by a compression spring 44 in the direction of the detent notches 10. An eye 45 permits the operator to grip the bolt and withdraw it from the detent 10 for change in the position of linkage. As shown in FIG. 5, the levers 5 and 6 are locked to the respective shafts 3 and 4 by respective setscrews 46.

The invention described and illustrated is believed to admit of many modifications within the ability of persons skilled in the art, all such modifications being considered within the spirit of scope of our invention except as otherwise limited in the appended claims.

We claim:

1. In combination with an apparatus for the raking, turning and tedding of a crop lying on the ground and having at least two horizontally-spaced rotary rakes with generally upright axes of rotation, a generally horizontal support interconnecting said rakes, respective wheel members carrying said support at said rakes, and drive means for rotating said rakes, the improvement which comprises:

means including respective shafts rotatably mounted on and extending codirectionally from said support for mounting each of said wheel members for rotation relatively to said support about the axis of the respective rotary rake;

link means coupling said shafts for joint rotation about said respective axes in the same sense relatively to said support; and means for locking the link means and shafts in adjusted rotated position relative to said support.

2. The improvement defined in claim 1 wherein said support includes a support beam and, at horizontally spaced locations therealong, a respective rake head upon which the respective rotary rake is journaled and enclosing respective rake-drive gearing, said shafts extending through the respective heads and emerging therefrom above said rakes, said link means including a respective lever fixed to each shaft above the respective head and a connecting rod pivotally connected to both said levers.

3. The improvement defined in claim 2 wherein said connecting rod, said levers and the support between said shafts define a parallelogrammatical linkage for concurrent and identical angular displacement of the respective shafts and wheel members.

4. The improvement defined in claim 2, further comprising coupling means in fixed angular orientation to one of said heads with respect to the axis of the respective rake for connecting said support to a towing vehicle.

5. The improvement defined in claim 4 wherein said coupling means includes means remote from said one of said heads for pivotally connecting said coupling means with the drawbar of a tractor with freedom of at least limited angular movement of said coupling means relative to the tractor about a substantially vertical axis.

6. The improvement defined in claim 2 wherein one of said levers is a bellcrank lever having one arm pivotally connected to said link and another arm forming a handle for swinging said levers and said shafts.

7. The improvement defined in claim 6 wherein said other arm has a rearwardly facing flank with respect to the forward movement of said apparatus, further comprising warning means on said flank for indicating the presence of said apparatus to oncoming vehicles.

8. The improvement defined in claim 7 wherein said warning means includes light reflectors spaced along said other arm.

9. The improvement defined in claim 6 wherein said means for locking the link means and shafts includes detent means co-operating with the respective head for indexing said shafts in selecting angular positions relatively to said heads.

10. The improvement defined in claim 9 wherein said levers, said link and said support between said shafts form a parallelogrammatical linkage.

References Cited

UNITED STATES PATENTS

| 2,028,332 | 1/1936 | Johnson | 56—322 X |
| 2,761,692 | 9/1956 | Sisulak. | |

FOREIGN PATENTS

| 1,349,793 | 12/1963 | France. |
| 1,352,607 | 1/1964 | France. |

F. BARRY SHAY, Primary Examiner

U.S. Cl. X.R.

56—322